June 14, 1955     T. J. RHODES     2,710,425
MOLDING APPARATUS

Filed May 18, 1951     9 Sheets-Sheet 1

INVENTOR.
THOMAS J. RHODES
BY James J. Long
AGENT

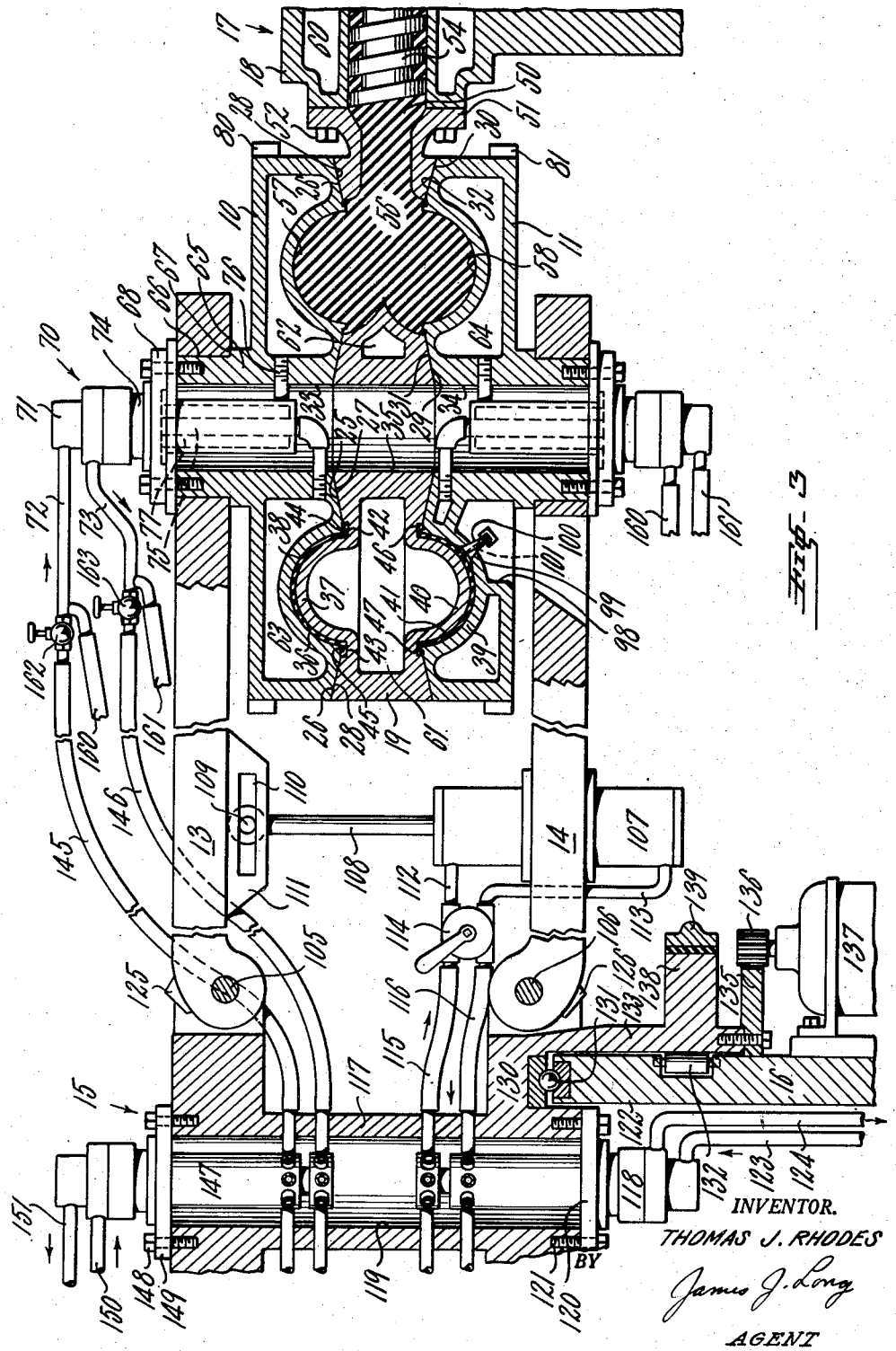

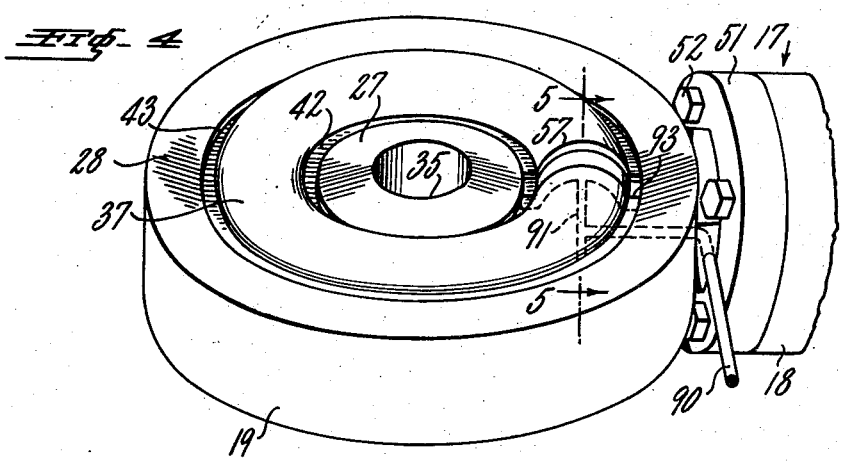
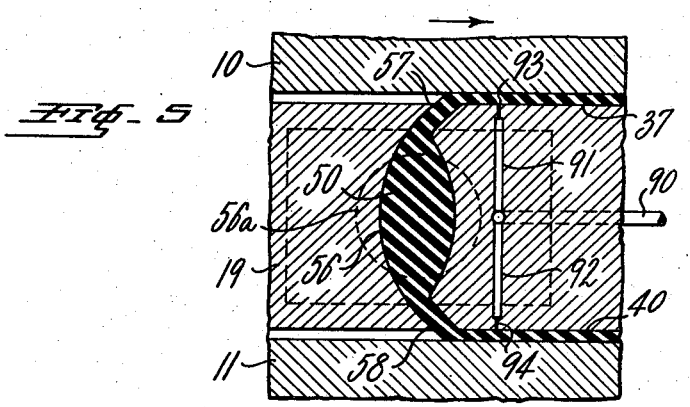
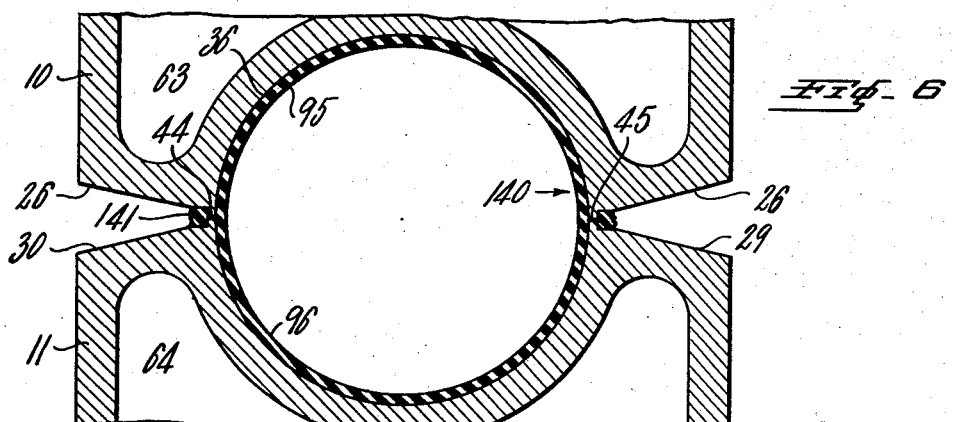

June 14, 1955  T. J. RHODES  2,710,425
MOLDING APPARATUS
Filed May 18, 1951  9 Sheets-Sheet 4

INVENTOR.
THOMAS J. RHODES
BY James J. Long
AGENT

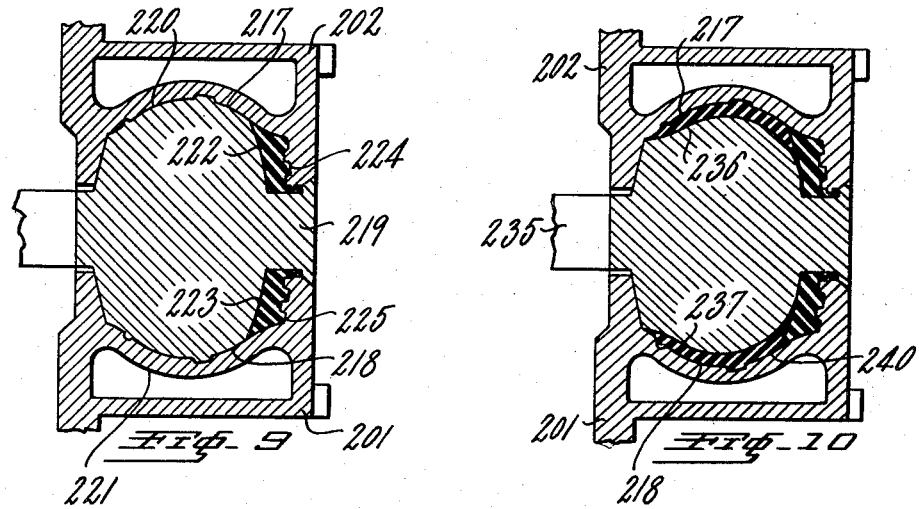
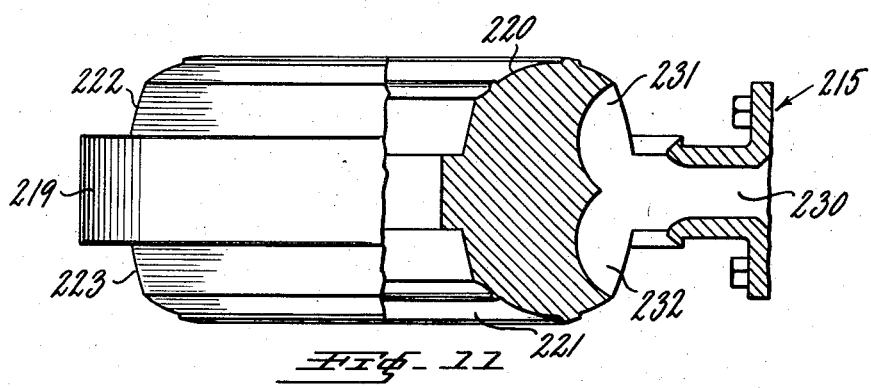
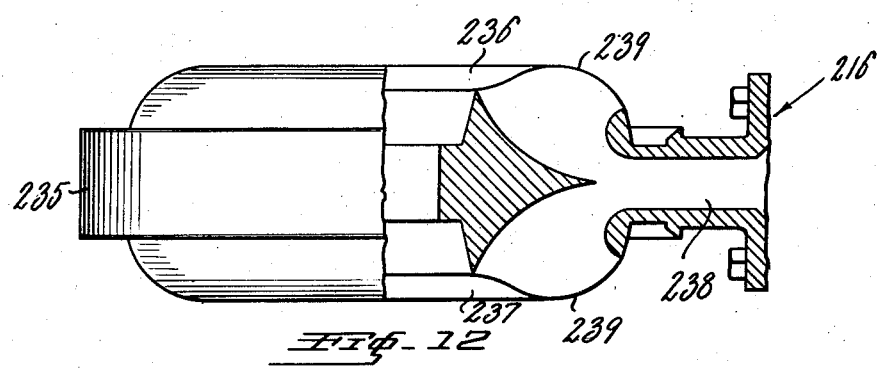

INVENTOR.
THOMAS J. RHODES
BY James J. Long
AGENT

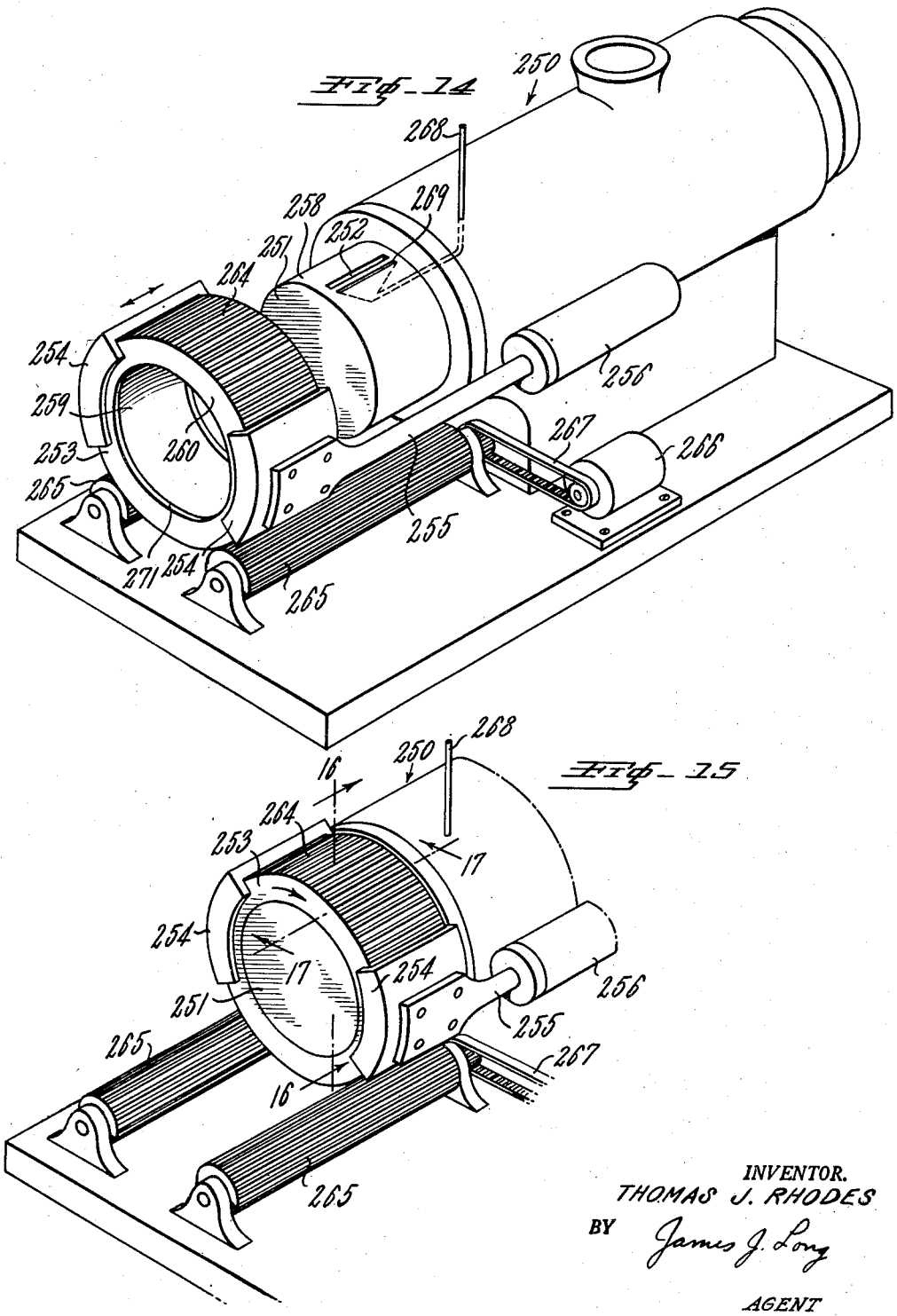

June 14, 1955 T. J. RHODES 2,710,425
MOLDING APPARATUS
Filed May 18, 1951 9 Sheets-Sheet 8
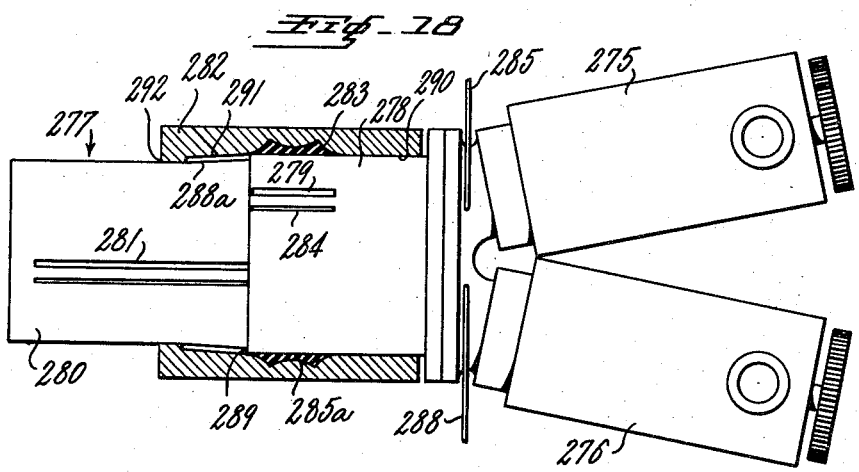
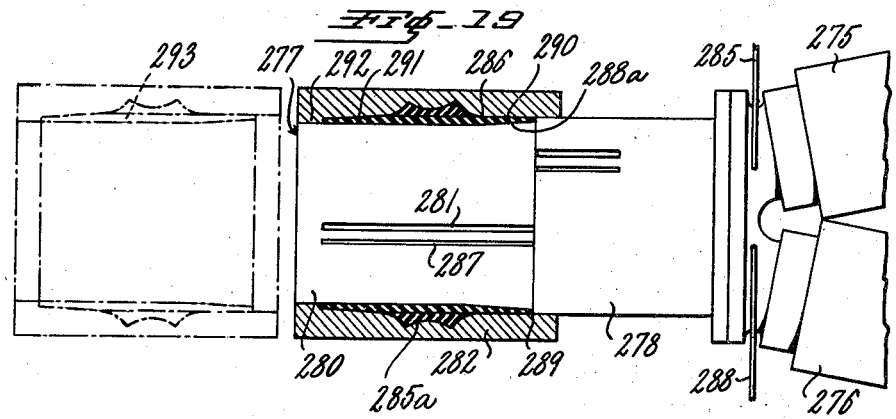
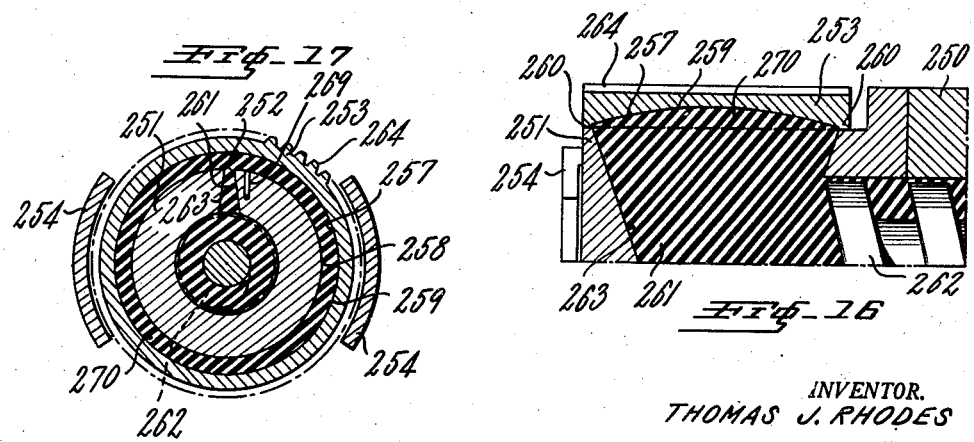
INVENTOR.
THOMAS J. RHODES
BY James J. Long
AGENT June 14, 1955
T. J. RHODES
2,710,425
MOLDING APPARATUS
Filed May 18, 1951
9 Sheets-Sheet 9
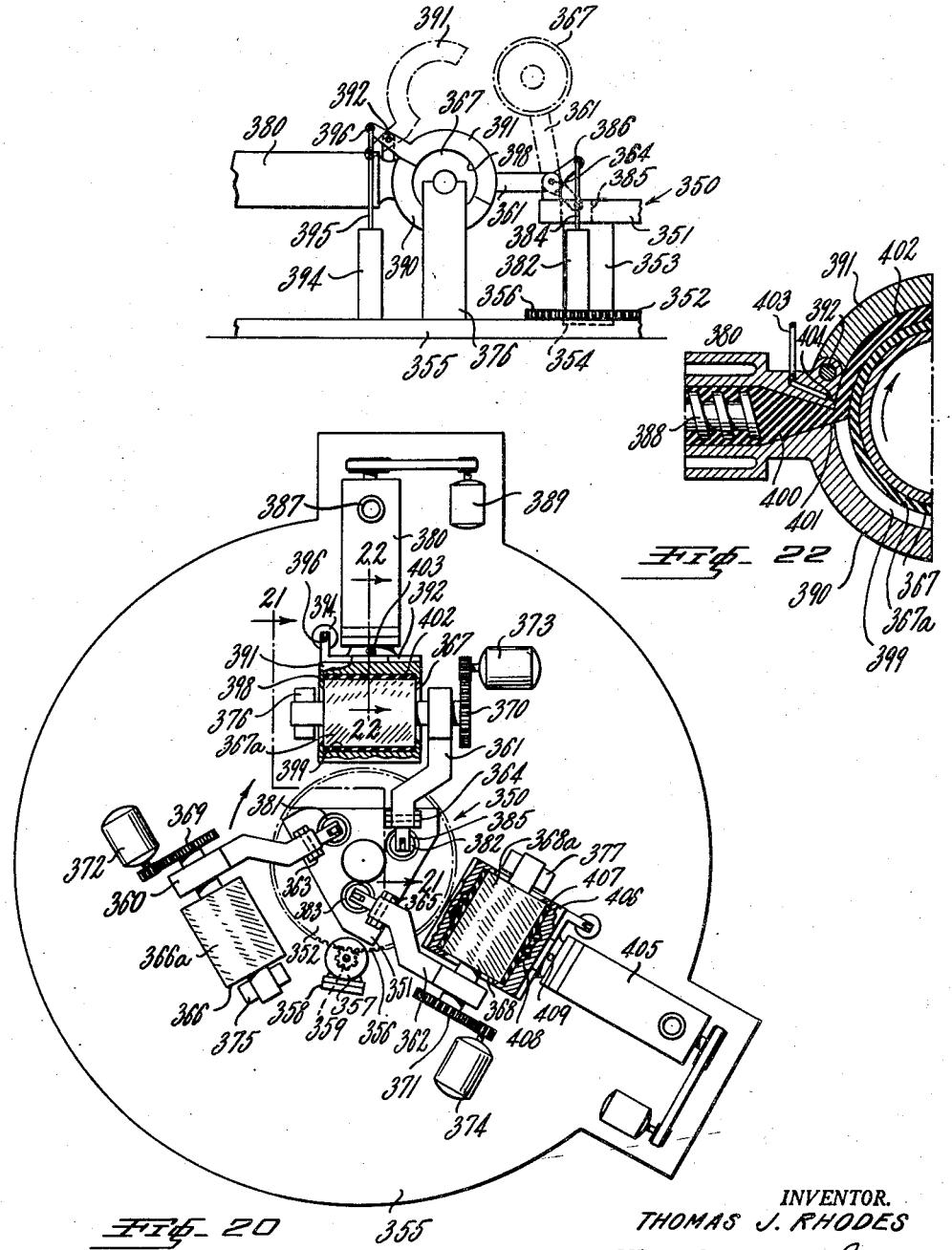
INVENTOR.
THOMAS J. RHODES
BY James J. Long
AGENT

United States Patent Office 2,710,425
Patented June 14, 1955

2,710,425

MOLDING APPARATUS

Thomas J. Rhodes, Clifton, N. J., assignor to United States Rubber Company, New York, N. Y., a corporation of New Jersey Application May 18, 1951, Serial No. 227,033

15 Claims. (Cl. 18—30)

This invention relates to an apparatus for shaping plastic material and more particularly it relates to an improved apparatus for molding annular articles, such as inner tubes, tire flaps, and pneumatic tires.

Another object is the provision of a molding apparatus for forming relatively large annular objects, which can be charged effectively and conveniently with highly viscous plastic stock, such as vulcanizable rubber stock. Because of the relatively great size of pneumatic tires and the relatively great viscosity of rubber stock, and because of the limitations imposed on heating of the rubber stock during shaping thereof, due to the heat-vulcanizable nature of the stock, it has not generally been the practice to form a tire casing in a mold by injection of rubber stock into the mold cavity. The invention provides a novel and improved method of distributing rubber stock uniformly and compactly in the mold cavity which obviates the foregoing difficulties.

Still a further object is to provide an apparatus for assembling a tire tread with a tire carcass which eliminates certain conventional manual operations and makes possible a more uniform and more firmly knit tire assembly.

The manner in which the invention accomplishes the foregoing and other objects and advantages will be made evident in the following detailed description, which is intended to be read with reference to the accompanying drawings of illustrative embodiments of the invention, wherein:

Fig. 3 is a side elevational view on a larger scale of a portion of the apparatus of Fig. 1, with parts broken away and parts taken in section along the line 3—3 of Fig. 1;

Fig. 4 is a perspective view on a larger scale of the mold charging portion of the apparatus of Fig. 1;

Fig. 5 is a fragmentary sectional side elevational view taken along the line 5—5 of Fig. 4;

Fig. 6 is a fragmentary sectional side elevational view of the mold halves in closed position for the vulcanizing step;

Fig. 9 is a fragmentary sectional elevational view on a larger scale taken along the line 9—9 of Fig. 7 and showing the tread portion of the tire casing in the mold;

Fig. 10 is a similar sectional view taken along the line 10—10 of Fig. 7 and showing the side wall portion of the casing in the mold;

Fig. 11 and Fig. 12 are side elevational views, with parts broken away, and parts in section, of the mold-charging portion of the apparatus of Fig. 7, for shaping the tread and side wall stocks respectively;

Fig. 14 is a perspective view of a further modification of the invention for molding a pneumatic tire flap;

Fig. 15 is a fragmentary perspective view of the apparatus of Fig. 14 with molding portions in an alternate position;

Fig. 16 is a fragmentary axial sectional elevational view taken along the line 16—16 of Fig. 15;

Fig. 17 is a transverse sectional elevational view taken along the line 17—17 of Fig. 15;

Figs. 18 and 19 are plan views, with portions broken away and portions in section, of still another modification of the invention for molding pneumatic tire treads and side walls from separate rubber stocks;

Fig. 20 is a plan view, with parts broken away and parts in section, of a modification of the invention for extruding tire side walls and treads from separate rubber stocks, directly onto the surface of a tire carcass;

Fig. 21 is a side elevational view of a portion of the apparatus of Fig. 20, taken along line 21—21 of Fig. 20, and Fig. 22 is a fragmentary sectional elevational view on a larger scale taken along line 22—22 of Fig. 20.

Figure 1:
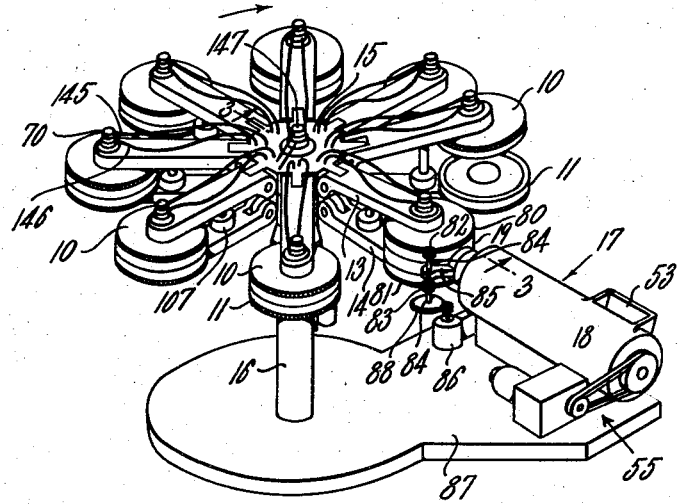
Fig. 1 is a perspective view of an apparatus constructed according to the invention for molding and vulcanizing inner tubes.

According to the invention, annular articles are formed by providing a mold cavity of the desired annular shape between two separable mold members, one a relatively fixed mold member and the other a relatively movable mold member which is rotatable about the principal axis of the annular cavity. Such mold cavity is charged with plastic stock by extruding or injecting the plastic stock into the cavity at a given point on the surface of the relatively fixed member through an entrance passageway provided in the fixed member for this purpose. To fill the mold cavity with plastic material, the movable mold member is rotated during the extrusion or injection operation, thereby carrying the plastic completely around the annular cavity from the entrance passageway, and such movement of the plastic is made possible by continually introducing a thin film of liquid lubricant between the surface of the plastic and the surface of the relatively fixed member. The liquid lubricant is introduced through an inlet passageway leading through the fixed mold member and opening into the mold cavity at a point on the internal surface of the fixed member in proximity to the entrance passageway for the plastic and spaced from such passageway in the direction of rotation of the movable mold part.

One embodiment of the invention disclosed herein contemplates manufacture of inner tubes by first forming such tubes in two halves in the form of complete annular bands having semi-circular transverse cross sections, which are subsequently circumferentially spliced to form the completed inner tube. The tube halves are preferably formed simultaneously in mold cavities defined by mold surfaces on each side of a relatively fixed mold core piece, such core piece being engaged at each face by rotatable outer mold members that, in cooperation with the core, form two closed annular cavities that are semi-circular in cross section. An entrance passageway for the rubber stock leads from each face of the core piece to a suitable extruder or injection apparatus which supplies the rubber stock to the mold cavities under pressure and at elevated temperature. As the rubber stock is extruded or injected through the core piece into the mold cavities, the outer mold members are rotated, thereby carrying the rubber stock completely around the cavities. During this operation a film of liquid lubricant is introduced between the surface of the core and the surface of the rubber stock.

After the inner tube is thus formed in two halves the outer rotatable mold members are lifted away from the core piece. The two inner tube halves remain attached to the rotatable mold halves because of the relatively greater adhesion of the rubber stock to the rotating halves compared to the adhesion of the stock to the lubricated surfaces of the core piece. The two mold halves are then brought together in proper register, effecting an accurate circumferential butt splice to form the completed tube enclosed within the cavity defined by the mating mold halves. Air or other fluid may then be introduced into the inner tube in the mold through a suitable valve stem, such stem having been previously put in place in a suitable recess in one of the mold halves prior to the mold charging operation, with the tip of the valve extending to the outside of the mold. The inner tube may then be vulcanized in the mold by application of heat thereto in the conventional manner.

In another embodiment of the invention disclosed herein a pneumatic tire casing is formed utilizing a two-stage mold-charging operation which makes it possible to form the tire casing of two different types of vulcanizable rubber stock, viz., a tread stock specially compounded for abrasion resistance, and a side wall stock compounded for optimum flexibility. First, the tire tread is formed into halves in annular cavities of suitable cross-sectional shape defined by a central fixed core piece and two rotatable outer mold halves cooperating therewith in the manner described previously in connection with the manufacture of inner tubes. An extrusion or injection means associated with this tread-forming assembly supplies rubber tread stock under pressure and in a heated condition to the two annular cavities as the outer mold halves are being rotated as previously described. After the tread halves are formed, the outer mold halves are brought away from the fixed core piece, bringing the tread halves with them, and then the mold halves are brought into engagement with the second fixed core piece which defines, with the rotatable mold halves, another mold cavity having the cross sectional shape of the side walls of the tire casing. An extruder associated with this core piece supplies the mold cavities with rubber side wall stock. After formation of the tread and side wall in two halves in this manner, the mold halves are removed from the core piece and a shaped tire carcass, containing in its interior the usual curing bag, is deposited in one of the outer mold halves and the second outer mold half is then brought into engagement therewith, enclosing the tire carcass between the two halves of the casing, and effecting a circumferential butt splice of the two halves of the casing. With the mold in the closed condition the usual heated fluid vulcanizing medium is introduced into the curing bag, while the mold is heated from the outside to effect vulcanization of the tire in the conventional manner.

In still another embodiment of the invention disclosed herein a pneumatic tire tread, or a tire flap, is made in the form of an annular band by extruding rubber stock onto a given point on the inner periphery of an annular mold having the cross-sectional shape of the tire tread or tire flap, formed between an annular circular fixed member and an outer encircling rotatable member. Rotation of the outer member serves to carry the rubber stock completely around the mold cavity, filling the cavity uniformly and compactly, and forming the tread as a spliceless, continuous band. Lubricant is introduced between the surface of the inner fixed mold member and the surface of the rubber stock, to facilitate rotation and distribution of the stock. Such an apparatus may be arranged to first extrude the tread portion proper of an abrasion-resistant stock, and to subsequently extrude the under-tread and side wall portions of different stock. After the extrusion operation the outer mold member, carrying the tread band or tire flap on its inner surface, is removed from the inner mold member. The tread band is removed and applied to a previously prepared tire carcass, and the assembled tread and carcass are thereafter shaped and vulcanized in the usual manner. In the case of tire flaps, the flap is removed and vulcanized in a suitable mold or on a suitable form.

Still another codification of the invention contemplates molding a pneumatic tire in flat band form in an annular cavity formed between an inner rotatable member and an outer encircling member. The rubber stock is extruded through the wall of the outer member onto the surface of the inner rotatable member. Rotation of the inner member carries the stock completely around the annular cavity, and lubricant introduced between the surface of the stock and the surface of the fixed member prevents sticking of the stock. The inner rotatable mold member advantageously also carries the tire carcass so that the tread is extruded directly onto the carcass. Most conveniently, the inner rotatable mold member has the general form of a tire building drum, and the tire carcass is built up on the surface of the drum, which is then inserted bodily in the extrusion machine for application of the tread. Again, the application of the tread may be accomplished in two distinct extrusion operations, the first of which applies an under-tread and side wall portion, and the second extrusion applies the tread proper over the portion first extruded. After the extrusion operation, the building drum is collapsed and the assembled tire casing is shaped and cured as usual.

Referring to the drawings, and in particular to Figs. 1 and 3, the apparatus for molding and vulcanizing inner tubes comprises a plurality of pairs of upper and lower rotatable mold halves or shells 10 and 11, which are mounted on pivotal arms 13 and 14 for movement into and out of engagement with each other. Each such pair of mold halves is adapted to contain an inner tube. A number of pairs of such pivotal arms 13, 14 extend radially from a central rotatable hub assembly 15 which may be rotated about a central vertical standard 16 to bring the several pairs of mold halves successively into engagement with a relatively fixed mold charging assembly 17. The mold charging assembly includes an extruder 18 which has a core piece 19 fixed to its delivery end.

When the upper and lower rotatable mold halves 10 and 11 are in operative engagement with the fixed core piece 19, as indicated in Fig. 3, cooperating beveled parting faces 25 and 26 at the inner and outer peripheries of the under-surface of the upper mold half meet cooperating oppositely beveled parting faces 27 and 28 on the upper surface of the core piece, while corresponding beveled parting faces 29 and 30 on the upper surface of the lower mold half bear against cooperating oppositely beveled parting faces 31 and 32 on the under surface of the core piece. The upper and lower mold halves or shells 10 and 11 are annular in form, and have central axial openings 33 and 34, respectively, therethrough. The fixed core piece 19 is likewise annular and has a central transverse axial opening 35 therethrough.

The under side of the upper mold half 10 contains an annular curved recess 36 between the inner and outer parting faces 25, 26, having the external form of one-half of an inner tube, which in cooperation with an annular curved protrusion 37 on the upper surface of the core piece defines an annular cavity 38 for forming one-half of the inner tube in the form of an annulus which is semi-circular in radial cross-section, that is, a trans-axial half of an inner tube. A similar recess 39 on the inner surface of the lower mold half, and a similar protrusion 40 on the under side of the core piece define an annular cavity 41 for forming the remaining half of the inner tube.

At the inner and outer edges of the upper mold cavity 38 the core piece is provided with radially extending inner and outer recesses 42 and 43 respectively. Inner and outer projections 44 and 45 extend downwardly from the upper mold half partially into the recesses 42 and 43 respectively. This arrangement provides for formation of inner and outer flange-like projections 46 and 47 at each edge of the inner tube halves and thus facilitates formation of a proper splice when the two halves are brought together in the manner hereinbelow described. This arrangement is duplicated on the lower mold half and on the under face of the core piece.

For introducing rubber inner tube stock 50 in a heated plastic condition under pressure into the upper and lower mold cavities 38 and 41, the core piece 19 is provided at one point on its outer periphery with a radial extension and flange 51, through which bolts 52 pass for the purpose of fastening the core piece to the delivery head of the extruder 18. The rubber stock 50 is fed into an entrance hopper 53 (Fig. 1) of the extruder 18 and is advanced under pressure by the action of a feeding screw 54 (Fig. 3) therein which is driven by a conventional driving mechanism 55 (Fig. 1) located at one end of the extruder. The stock passes from the extruder into a delivery passageway 56 extending through the extension and flange 52 of the core piece. The passageway diverges upwardly and downwardly through the respective curved portions 37 and 40 on the upper and lower faces of the core piece and terminates in entrance slots 57 and 58 located at the upper and lower faces of the core piece. The delivery passageway 56 preferably gradually changes in shape from a round cross-section, as indicated by the dotted lines at 56a in Fig. 5, where it abuts the end of the extrusion chamber, to a relatively narrow elongated slot shape at the entrance slots 57 and 58. The passageway 56 as it approaches the slots 57 and 58 may be inclined somewhat in the direction of rotation of the upper and lower mold halves 10 and 11 to facilitate the entrance and distribution of the rubber stock, which is intended to be carried, with the rotating mold halves with which it makes frictional engagement, completely around the upper and lower annular cavities 38 and 41. The entrance slots 57 and 58 extend completely across the respective cavity faces of the upper and lower mold halves.

For the purpose of heating the rubber stock to a suitable plastic condition the body of the extruder 17 is provided with the usual interior hollow cores 60 (Fig. 3) through which a heating medium may be circulated, and the core piece also has hollow cores 61 and 62 for this purpose. It will be understood that the hollow cores are connected by suitable entrance and exit pipes (not shown) to a source of heated fluid. The upper and lower mold halves also have hollow cores 63 and 64, respectively, through which fluid media may be circulated by means to be described.

For the purpose of rotating the upper and lower mold halves to distribute the rubber stock around the mold cavities, the upper and lower halves are rotatably mounted at the ends of their respective supporting arms 13 and 14. The rotatable support for each of the mold halves is identical, and therefore only the upper assembly will be described. A hollow central hub 65 extends upwardly from the central periphery of the annular mold half 10 and has a section 66 of reduced diameter which passes rotatably through a corresponding vertical hole in the supporting arm 13. A flange portion 67 at the lower extremity of the reduced portion 66 bears slidably against the under side of the arm 15 to aid in maintaining the mold assembly in place thereon. The upper terminal end of the reduced portion 66 is flush with the upper surface of the arm 13 and carries a flange assembly 68 which is secured to the hub 65 by bolts 69 passing therethrough.

For the purpose of introducing fluid heating or cooling media into the hollow core 63 of the mold half there is secured to the flange assembly 68 a rotary seal coupling 70, which is a commercially available device, commonly used for introducing a fluid to a rotating member at the axis of rotation thereof. A non-rotating head 71 constituting the upper portion of the rotary seal coupling is connected to inlet and outlet pipes 72 and 73. The lower portion 74 of the rotary seal coupling rotates with respect to the head portion 71 and is rigidly attached to the flange assembly 68. The rotary portion 74 extends axially downwardly into the central hole 33 in the mold half. A central rotating pipe 75, which is in communication with the non-rotating entrance pipe 72 within the rotary seal coupling, passes downwardly axially of the rotating portion 74 and passes out through the bottom thereof and then passes radially into the annular hollow core 63 of the mold. Fluid thus introduced passes out at the opposite side of the hollow core 63 into an exit pipe 76 which leads to an annular passageway 77 upwardly through the rotating portion 74 and into communication, within the rotary seal coupling, with the non-rotating exit pipe 73. In this way fluid may be circulated through the hollow core 63 even while the mold is rotating.

The mold halves are rotated by means of peripheral gear teeth 80 and 81 disposed around the upper and lower edges of the upper and lower mold halves, respectively. As indicated in Fig. 1, the gear teeth 80, 81 engage vertically spaced pinion gears 82 and 83 on a vertical driving shaft 84 that is rotatably supported on a bracket 85 fixed to the extruder head, and so disposed that when the mold halves are in proper register with the fixed core piece, the peripheral gears 80, 81 mesh with the pinion gears 82, 83. A suitable driving mechanism 86 located on the base 87 of the machine engages a driving gear 88 on the lower end of the vertical driving shaft 84.

As the mold halves are rotated, the rubber stock 50 is introduced to the mold cavities 38 and 41 through the entrance slots 57 and 58, and the stock is carried around the cavities by such rotation by reason of the frictional engagement of the stock with the surfaces 36 and 39 of the rotating parts of the cavities. Such movement of the rubber stock with respect to the surfaces 37 and 40 of the core piece 19 is made possible by reducing the friction between the moving rubber stock and the core surfaces to a minimum. This is accomplished by continually introducing a thin film of a suitable lubricating liquid, such as paraffin oil or the like, between the surface of the core piece and the surface of the advancing rubber. For this purpose a lubricant feed line 90 (Figs. 4 and 5) connected to a suitable positive pumping source (not shown) leads into internal upwardly and downwardly extending lubricating passageways 90 and 91 (Fig. 5) within the core piece. The internal lubricating passageways terminate in fine slit-like openings 93 and 94, respectively, in the cavity faces 37 and 40 of the core piece. The fine openings 93 and 94 extend transversely completely across the cavity faces 37 and 40 and are slightly spaced from the stock delivery entrances 57 and 58 in the direction of rotation of the mold halves. During the extrusion and rotation operation a small quantity of liquid lubricant is continually introduced through the slits 93 and 94, spreading a thin continuous film between the surfaces of the stock and the surfaces of the fixed core. In this way, the stock is enabled to move freely with respect to the surface of the core piece, thereby being carried completely around the cavity by the wiping action of the rotating mold halves, forming, when the mold halves make a single complete revolution, complete annular bands 95 and 96 of rubber stock constituting the two complementary inner tube halves. As the mold halves complete their revolution, the rubber stock is sheared off at the entrance orifices.

In order to incorporate the usual valve stem in one of the inner tube halves, the lower mold half 11 is provided, toward its inner periphery, with a partially cut-away portion 98 having an opening 99 extending from the interior of lower mold cavity 39 to the outside of the mold.

The opening 99 accommodates the usual valve stem assembly 100 which includes a previously assembled metal valve stem threaded at its outer end, and a preformed rubber exterior portion. The opening 99 is of such size and shape as to accommodate snugly and firmly the valve stem assembly, which may be inserted in the opening 99 from the inside of the mold prior to bringing the mold half 11 into engagement with the core piece 19 for the mold charging operation. To prevent the passage within the valve stem 100 from becoming clogged with rubber, a solid metal rod 101 of such diameter as to fit snugly in the valve stem 100 is inserted therein prior to the charging step. The rod 101 carries on its outer end a threaded cap which screw threadedly engages the exterior thread on the tip of the valve stem. The rod 101 is of such length that when threaded into place its inner end surface just contacts the face 41 of the core piece. In this way, the rod forms a core which, when it is removed after the mold charging operation, leaves a passageway for air from the interior of the inner tube to the valve stem.

After the cavities are charged with rubber stock by the extrusion and rotation operation described, the mold halves may be removed from the core piece. For this purpose the arms 13 and 14 supporting the mold halves are pivotally secured by pivot pins 105 and 106 to the upper and lower portions of the central rotatable hub assembly 15. For effecting a relative opening movement of the arms 13 and 14 away from each other, a hydraulic cylinder 107 is mounted on the lower arm in a vertical position, and has a piston rod 108 extending upwardly and connected to the upper arm 13 by means of a sliding pin 109 fixed to the end of the piston rod, which slides in a slot 110 in a bracket 111 fixed to the under side of the upper arm.

Hydraulic pressure may be applied to either end of the cylinder 107, to actuate it in either direction for opening or closing movement, by means of pipes 112 and 113 leading from each end of the cylinder to a conventional four-way hydraulic control valve 114. Flexible metal hose hydraulic supply lines 115 and 116, connected to the control valve 114, pass through a hollow central post 117 of the hub assembly and are attached to a conventional rotary seal coupling 118 extending upwardly into the interior hollow 119 of the hub assembly. The rotary seal coupling 118 is secured to a flange plate 120 that is attached to the lower central portion of the hub assembly by means of bolts 121. The fixed vertical standard 16 on which the rotating hub assembly 15 is mounted has a hollow interior 122 into which the lower stationary portion of the rotary seal coupling extends, and supply lines 123 and 124 lead from the lower portion of the rotary seal coupling to the usual pumping system (not shown) for the hydraulic fluid. The rotary seal coupling is adapted to supply hydraulic fluid to each of the cylinders 107 on each of the arm assemblies.

Stops 125 and 126 on the inner ends of the arms 13 and 14, respectively, limit the opening movement of the arms by engagement with the hub assembly 15 when the arms are moved apart by the hydraulic cylinder 107.

As the arms 13, 14 are moved apart to separate the mold halves from the core piece 19 the two halves 95 and 96 of the inner tube remain in place within the respective mold halves. To permit bringing of the two halves of the inner tube together to form the completed tube, means are provided for rotating the hub assembly 15 from which the mold supporting arms 13, 14 extend. For this purpose a lower horizontal flange member 130 of the hub assembly is rotatably mounted on the upper surface of the fixed central standard 16 by means of ball-bearing assemblies 131. To provide further stability as the hub assembly 15 rotates, vertical bearings 132 mounted on the outer surface of the vertical standard 16 engage the inner surface of an annular collar 133 extending downwardly from the horizontal flange member 130.

The lower face of the collar extension 133 has fastened thereto by means of bolts 134 a ring gear 135 having gear teeth on its external periphery. The gear 135 meshes with, and is driven by, a pinion gear 136 carried on a driving motor 137 mounted on one side of the fixed standard 16. The driving motor may be turned on and off manually, or may be operated by suitable automatic controls.

In order to position the hub assembly accurately when it is desired to bring the mold halves into exact register with the core piece, there is provided a brake flange 138 extending outwardly near the lower portion of the collar 133, such brake flange being engaged at its outer periphery by a brake shoe assembly 139, actuated by conventional means (not shown) when it is desired to stop the rotation of the hub assembly 15.

After the arms 13, 14 are moved away from the core piece 19 and the hub assembly 15 has been rotated a suitable distance to bring the arms away from the charging station 17, the two mold halves 10 and 11 are brought together again by actuation of the hydraulic cylinder 107. This effects circumferential butt-splicing of the two inner tube halves as indicated in Fig. 6 to form a completed tube 140. As the splice is made, excess stock 141, representing the residue of the edge flanges 46 and 47 (Fig. 3) formed on the tube halves, is squeezed out from between the projecting portions 44 and 45 of the mold halves.

In order to introduce air into the inner tube 140 (Fig. 6) within the mold, the rod 101 (Fig. 3) is removed from the valve stem 100 by unscrewing the cap thereof, and an air hose (not shown) may be coupled to the valve stem. The inner tube may be vulcanized by introducing a heated fluid vulcanizing medium such as steam to the interior hollow cores 63 and 64 of the mold halves through the rotary seal coupling assemblies on each of the mold halves as previously described. The fluid inlet and outlet lines 72 and 73 leading to the upper mold are connected by means of flexible hoses 145 and 146 to a conventional rotary seal coupling 147 extending into the interior 119 of the central hub post 117, and fastened at the upper portion of the hub assembly by means of bolts 148 passing through a flange 149 of the coupling 147. For bringing the vulcanizing fluid from an external source to the rotating hub, inlet and outlet fluid lines 150 and 151 lead to the upper portion of the rotary seal coupling 147.

The inlet and outlet lines 72 and 73 leading to the rotary seal coupling on the upper mold half 10 are connected, by means of flexible hoses 160 and 161, to the rotary seal coupling on the lower mold half so that the vulcanizing fluid will be circulated through the lower mold half also. The circulation of the vulcanizing fluid may be controlled by means of valves 162, 163 located in the fluid lines 72, 73. After the vulcanizing fluid has been circulated through the mold halves for a sufficient period of time at an appropriate sufficiently elevated temperature, the inner tube will have become completely vulcanized. After the vulcanization, the mold may be opened by separating the supporting arms 13, 14 by means of the hydraulic cylinder 107. The completed inner tube may then be removed from the mold.

Figure 2:
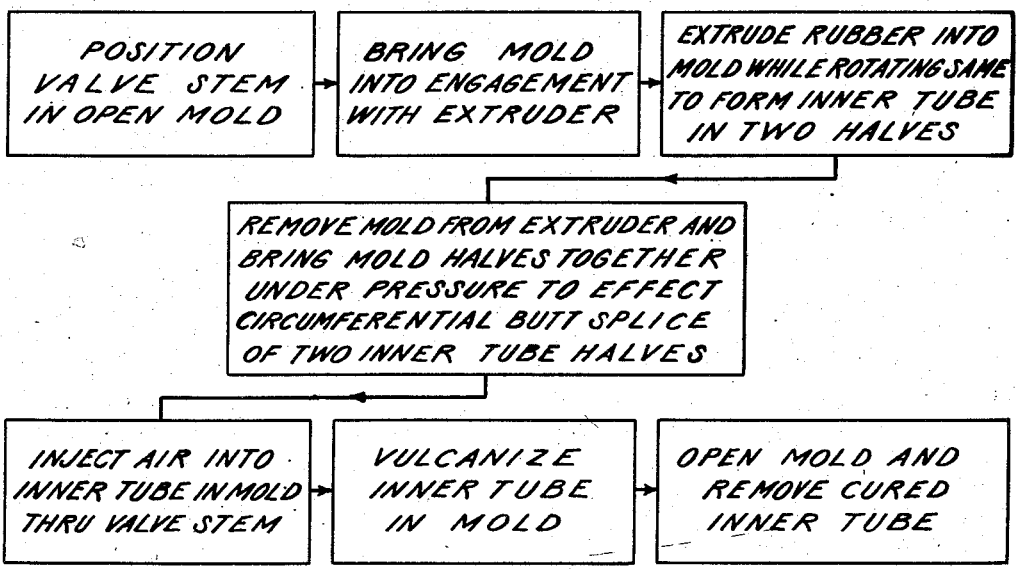
Fig. 2 is a flow diagram representing successive steps of a process for making inner tubes adapted to be carried out in the apparatus of Fig. 1.

The operation of the foregoing embodiment of the invention may be followed by reference to the flow diagram, Fig. 2. With the mold halves or shells 10 and 11 initially in the open position, as indicated at the 2 o'clock position in Fig. 1, the operator inserts the previously prepared valve stem assembly 100, with the interior rod 101 threaded into place thereon, into the opening 99 provided in the lower mold shell 11 for this purpose. The hub assembly 15 is then rotated about the central standard 16 by means of the driving motor 137, until the shells 10, 11 coincide with the core piece 19 attached to the delivery end of the extruder 18 at the mold charging station 17. The extruder 17 and core 19 are heated to a suitable elevated temperature by means of circulating fluid in the internal passageways 60, 61, and 62 thereof, while the mold halves 10 and 11 are themselves heated to vulcanizing temperatures by fluid circulated through the supply lines 150, 151 connected to the central distributing rotary seal coupling assembly 147, and radially through connecting lines 145, 146, and 72, 73 to the rotary seal coupling 70 mounted on the end of the upper supporting arm 13, whence the fluid has access to the hollow spaces 63 in the upper mold half. The fluid is supplied by branch lines 160 and 161 to the hollow spaces 64 of the lower mold half 11 through a similar rotary seal coupling mounted toward the end of the lower arm 14.

When the mold halves 10 and 11 are in proper register with the core piece 19 the supporting arms 13 and 14 are moved toward each other by means of the hydraulic cylinder 107 and connecting arm 108, which is controlled by the valve 114, supplied with hydraulic fluid from the supply lines 123, 124, through the lower central rotary seal distributing coupling 118 and the connecting lines 115, 116. In this way the mold halves 10, 11 are brought into operative engagement with the upper and lower surfaces of the core piece 19, as indicated at the 5 o'clock position in Fig. 1. In this position, the peripheral gear teeth 80, 81 at the outer edges of the mold halves engage the driving pinion gears 82, 83.

The apparatus is now ready for the mold charging operation which is accomplished by advancing the rubber stock 50, fed into the entrance hopper 53 of the extruder 18, forwardly under pressure by the action of the extruder screw 54 through the passageway 56 leading from the extruder to the discharge slits 57 and 58 located on the upper and lower surfaces of the core. In this way the mold cavities are charged locally with rubber stock at the point of extrusion. At the same time, the mold halves 10 and 11 are rotated with respect to the core by means of the driving mechanism 86 and the driving gear 88, the pinion gears 82, 83 and the peripheral gear teeth 80, 81 on the mold halves. This rotation of the mold halves causes the relatively highly viscous rubber stock to be carried all around the annular mold cavities 38 and 41 by reason of the frictional engagement of the stock with the mold shells, forming the two trans-axial halves 95 and 96 of the inner tube. The rotation of the molds and the distribution of the rubber stock is facilitated by continuously introducing a liquid lubricant, such as paraffin oil, supplied under positive pressure by a suitable pump, through the lubricant supply line 90 passing into the core extension to internal distributing passageways 91 and 92, which feed the lubricant to the fine slit-like openings 93 and 94 in the upper and lower core surface. In this way a thin lubricating film is maintained between the rubber stock in the mold cavities 38 and 41 and the surfaces 37 and 40 of the core piece 19. The mold lubricant is preferably a substance which is compatible with or soluble in the rubber, so as not to interfere with the splicing of the rubber. Paraffin oil is well suited to this purpose.

As the mold halves complete a single revolution the rubber stock is sheared off at the extrusion orifices 57, 58, and the hydraulic cylinder 107 is actuated to move the supporting arms 13 and 14 apart, separating the mold halves from the core. The molded inner tube halves 95, 96 remain with the mold shells 10, 11 because of the relatively greater adherence of the rubber stock to the surfaces of the shells than to the lubricated surfaces of the core piece 19. The driving motor 137 is again actuated to rotate the central hub 15 about its axis, moving the mold halves containing the inner tube halves away from the extruder 18, and at the same time bringing the next successive pair of mold halves into alignment with the extruder for a repetition of the foregoing mold charging operation. The mold shells containing the inner tube halves 95, 96 are then brought into engagement with each other by actuating the cylinder 107, as indicated at the 6 o'clock position in Fig. 1, thereby uniting the edges of the two inner tube halves under pressure and effecting a circumferential splice thereof. The excess stock 141 (Fig. 6) squeezed out from between the projecting lips 44 and 45 of the mold halves by this operation may be returned to the hopper 53 of the extruder.

The rod 101 which served to keep the rubber stock from entering the valve stem 100 is removed therefrom, the usual valve core is substituted therefor, and an air hose is applied to the valve stem to provide a suitable internal air pressure within the tube during the vulcanization. The mold halves are maintained in this closed relative position as they are moved progressively around the central hub 15 as successive pairs of mold halves are being charged as described. Concurrently with the transportation of the closed mold halves about the hub 15, the inner tube is being vulcanized, it being understood that the mold halves are being heated all this time by fluid in the interior hollow spaces 63, 64 thereof. By the time the closed mold halves are transported past the 2 o'clock position indicated in Fig. 1, the inner tube is completely vulcanized and the mold halves are separated once more by the action of the hydraulic cylinder 107 as indicated at the 3 o'clock position in Fig. 1. The completed inner tube is then removed from the mold, and the foregoing cycle is again repeated.

From the foregoing it is evident that the invention not only provides a simplified method of making inner tubes which eliminates many operations and much equipment heretofore considered necessary in conventional manufacture, but also provides an improved inner tube that is more balanced and uniform than inner tubes made by conventional methods largely because of the absence of the usual transverse splice. The invention does away with the necessity for the conventional separate extrusion operation, with attendant non-uniformities arising from unavoidable variations in the character of the stock being extruded and variations in the conditions of extrusion. Difficulties arising from non-uniform swelling and shrinkage of the stock are avoided, as well as the non-uniformities commonly introduced when the extruded tube stock is handled prior to and during the usual butt splicing operation. The separate operation of punching a hole in the tube for the valve stem and the operation of applying the valve stem are eliminated. Because of the fact that no conventional extrusion operation is required, it is unnecessary to employ soapstone or talc in the usual manner, and the invention thereby eliminates the dust nuisance that ordinarily constitutes a health menace and impediment to efficiency in the plant. In the conventional extruded inner tube, strains and irregularities leading to weak spots frequently arise as the straight extruded tube is formed into annular shape. There is no occasion for such non-uniformity in the present method and the separate operation of shaping the tube is done away with. The present process is economical due to the fact that virtually no material is wasted and such flash as occurs during the molding operation is uncured and can be used over again. The apparatus used in the present method makes possible the greatest economy from the standpoint of heat, since the rubber heated up in the extrusion operation is injected into the previously heated mold without loss of heat. Relatively little labor is required to operate the present apparatus, in contrast to the numerous operators necessary to keep the conventional inner tube line in operation. The present apparatus also requires less floor space than a conventional inner tube production unit.

Figure 13:
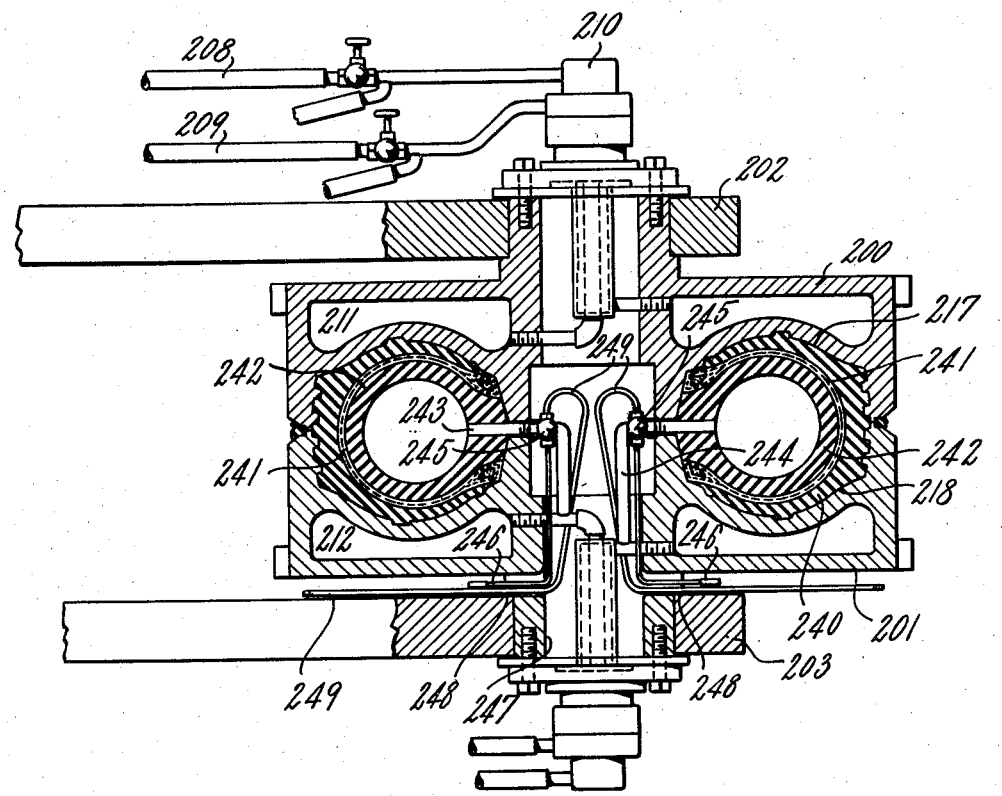
Fig. 13 is a side elevational view with parts broken away and parts taken in section along the line 13—13 of Fig. 7.

In the modification of the invention shown in Figs. 7 to 13 inclusive for manufacture of pneumatic tires there is again provided a plurality of pairs of mating upper and lower mold halves 200 (Figs. 7 and 13) and 201 (Fig. 13) supported rotatably on pairs of upper and lower radial supporting arms 202 (Figs. 7 and 13) and 203 (Fig. 13)

which are pivotally mounted for movement toward and away from each other on a central rotatable hub 204. Vulcanizing fluid supply lines 205 and 206 again pass to a rotary seal coupling 207 mounted on the central hub assembly 204, from which fluid is distributed to each of the several mold pairs by supply lines 208 and 209 passing along the upper supporting arms 202 to rotary seal couplings 210 on the rotating mold halves. The fluid passes into the hollow cores 211 and 212 (Fig. 13) within the mold halves in the manner previously described in connection with Fig. 3.

The several pairs of mold halves are adapted to engage successively two extruder assemblies 215 and 216 located at spaced points on the circumference of the circle described by the molds as the hub assembly rotates. The upper and lower mold halves have interior curved faces 217 and 218 (Figs. 9, 10 and 13), respectively, each having the form of a trans-axial half of a tire casing. The first extruder assembly 215 has fixed to its delivery head a core piece 219 (Figs. 9 and 11) the upper and lower surfaces of which are adapted to be engaged by the upper and lower mold halves. Parts 220 and 221 of the upper and lower faces of the core piece 219 correspond in outline to the external surface of the tire side wall, and such parts contact the mold surfaces 217 and 218 of the upper and lower mold halves when such halves are brought into engagement with the core piece as shown in Fig. 9. Toward the outer diameter of the core piece the upper and lower core surfaces are cut away along surfaces 222 and 223, corresponding to the base line of the tire central tread portion proper and defining, with the remainder of the surfaces 217 and 218 of the cores, two annular mold cavities 224 and 225 (Fig. 9) each adapted to form one-half of the central tire tread. A delivery passageway 230 (Fig. 11) for the rubber tread stock leads from the extrusion chamber into the core piece and is diverted upwardly and downwardly to entrance slots 231 and 232 leading to the upper and lower cavities. As the rubber tread stock is extruded through the passageway 230 and out through the entrance slots 231 and 232 into the tread cavities 224 and 225, the upper and lower mold halves are rotated to carry the stock completely around the annular cavities by a driving mechanism 215a (Fig. 7) located next to the extruder 215 in the manner described in connection with Figs. 1 and 3. Simultaneously with this extrusion and rotation operation a thin film of liquid lubricant is applied between the surface of the tread stock and the fixed cavity surface on the core piece. Such lubricant is introduced through a supply line 233 (Fig. 7) terminating in a fine opening (not shown) extending transversely of the cavity surface on the core piece and spaced somewhat from the entrance slots in the direction of rotation of the mold halves, all as described previously in connection with Figs. 4 and 5.

After the tread portions of the tire are formed, the radial supporting arms 202, 203 are moved away from each other by means of a hydraulic cylinder mechanism (not shown) associated with the supporting arms in the same manner as the hydraulic cylinder 107 mounted on the supporting arms 13 and 14 in Fig. 3. This separates the upper and lower mold halves 200, 201 from the core piece 219, and the central hub 204 may then be rotated to transport the supporting arms and mold halves in a counter-clockwise direction, as viewed in Fig. 7, into alignment with the second extruder assembly 216. It will be understood that rotation of the hub assembly 204 may be effected by driving means of the character illustrated in Fig. 3.

The supporting arms 202 and 203 may then be brought together to bring the mold halves containing the tread portions into proper register with a second fixed core piece 235 (Figs 10 and 12) attached to the head of the second extruder 216. When the mold halves are in engagement with the core piece 235 the surfaces 217 and 218 of the mold halves are spaced from the opposite surfaces 236 and 237 of the core piece and there is defined therebetween a mold cavity having the shape of one-half of the tire casing. At this stage in the process the two halves of the tire tread are already in place within the mold cavity, while the portion of the cavity corresponding to the side walls and undertread portion of the tire remains to be filled with a different rubber stock.

The second extruder 216 is then operated to force side wall rubber stock through an entrance passageway 238 (Fig. 12), leading from the extruder 216 to the core piece 235, to peripheral extrusion orifices 239 at the upper and lower surfaces 236 and 237 of the core piece. The extrusion orifices 239 extend across the core faces from the base of the previously formed tread portion to the rim or bead extremity of the side wall area. The upper and lower mold halves are again rotated by means of a driving mechanism 216a (Fig. 7) during this extrusion operation, while lubricant is supplied as previously described. In this way under-tread and side wall portions are formed within the mold cavity, producing the complete outer tire casing 240 in two annular halves.

Following this extrusion operation, the upper and lower mold halves 201 and 202 are disengaged from the core piece 235, and the hub assembly 204 is again rotated a suitable distance in a counter-clockwise direction. With the mold halves in the open position, a previously prepared assembly of a tire carcass 241 (Fig. 13) and expansible curing bag 242 is disposed over the half of the outer tire casing 240 contained in the lower mold half 201. It will be understood that the tire carcass 241 may be built up in band form of superimposed plies of rubberized tire fabric on a collapsible tire building drum (not shown) in the usual manner and thereafter shaped in the form of a torus with the aid of the usual vacuum shaping box (not shown), wherein the curing bag 242 is inserted in the carcass 241. The curing bag 242 has the usual inlet stems 243 extending from opposite sides of its inner diameter. When the assembly of curing bag and tire carcass is disposed over the trans-axial half of the outer tire casing contained in the lower mold half, the stems 243 extend through suitable openings at the inner diameter of the mold and are coupled to connecting fluid lines 244 for introducing a fluid heating medium to the interior of the bag. The supply lines 244 are in communication with the fluid chamber 212 within the mold half 201, and entrance of heating fluid into the bag is controlled by suitable three-way valves 245 which may be operated from outside the mold by means of extension handles 246 that pass downwardly within the central hollow chamber 247 of the mold assembly and thence pass outwardly radially through suitable slots 248 in the mold hub. The upper mold half 200 is then brought into engagement with the lower mold half 201, as indicated in Fig. 13, to enclose the tire and curing bag assembly under pressure and to effect a circumferential splice of the two annular halves of the casing. The tire casing fills out the mold cavity and conforms closely to the contours thereof under the influence of heat and the internal pressure supplied to the curing bag. The vulcanization of the tire carcass proceeds as the hub assembly 204 is rotated, and meanwhile the various other mold assemblies are being charged successively with rubber in the manner described. After being subjected to vulcanizing heat for a suitable interval the tire casing is completely vulcanized and the heating fluid may be exhausted from the interior of the curing bag 241 through exhaust lines 249 that pass from the three-way valves 245 downwardly through the central chamber 247 of the mold assembly and outwardly through the radial slots 248 in the mold hub. The exhaust lines 249 are adapted to be coupled at their outer extremities to suitable drain lines (not shown). It will be understood that the inlet stems 243 of the curing bag may be placed selectively in communication with either the connecting fluid lines 244 or the exhaust lines 249 by suitable adjustment of the three-way valves 245. If desired the curing bag 241 may be drained by coupling one of the exhaust lines 249 to a compressed air line, and coupling the other exhaust line 249 to a drain, thereby forcing the heating fluid from the bag. The mold is then opened and the vulcanized tire casing is removed from the mold cavity. The curing bag is removed from the finished tire and returned for insertion in another raw tire carcass.

Figure 7:
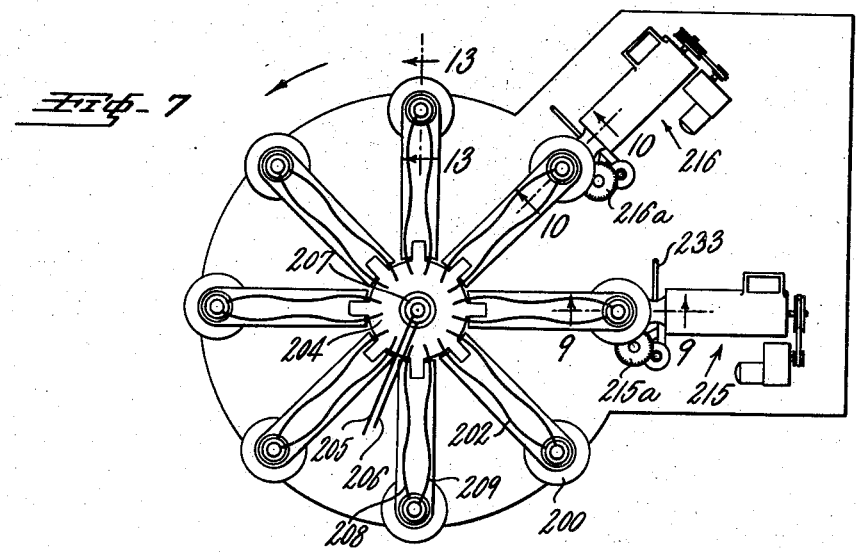
Fig. 7 is a plan view of a modification of the invention for molding and vulcanizing a pneumatic tire casing.
Figure 8:
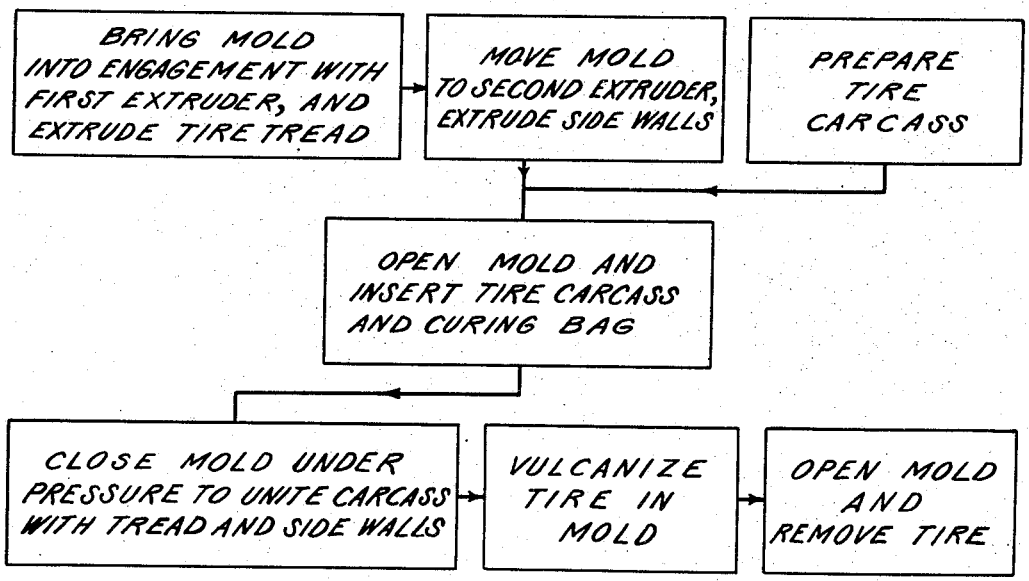
Fig. 8 is a flow diagram of successive steps of a process for making pneumatic tire casings adapted to be carried out in the apparatus of Fig. 7.

The operation of the foregoing modification of the invention may be followed by reference to the flow diagram, Fig. 8. Initially, the mold halves or shells 201, 202 are brought into engagement with the core 219 of the first extruder 215, as indicated at the 3 o'clock position in Fig. 7. The rubber tread stock is then extruded into the cavities 224 and 225 while rotating the mold halves by means of the drive 215a, and while introducing lubricant to the surfaces of the core piece through the line 233. The mold halves are then separated from the core piece 219 and the entire assembly is rotated about the central hub in a counter-clockwise direction to bring the mold halves into alignment with the second extruder 216, and the mold halves are then brought against the core piece 235 attached to this extruder, as indicated at the 2 o'clock position in Fig. 7. Side wall rubber stock is then extruded into the cavities with simultaneous rotation of the mold halves by the drive 216a and introduction of lubricant to the surfaces of the core piece. A lubricant that is miscible with the rubber stock, such as paraffin oil, is used to permit firmly knit union of the various sections of rubber stock. The mold is then opened and moved to the 12 o'clock position as indicated in Fig. 7, where the previously prepared tire carcass and curing bag are placed in the lower mold, and then the curing bag inlets 243 are coupled to the connecting fluid lines 244. The mold is again closed and the handles 246 of the three-way valves 245 are turned to permit heated fluid under pressure to pass into the curing bag. As successive pairs of mold halves are brought into engagement in turn with the extruders 215 and 216, the mold containing the tire and curing bag assembly continues to be heated at vulcanizing temperatures as it moves around in the counter-clockwise direction, and when it arrives at the 5 o'clock position the vulcanization of the tire is completed and the exhaust lines 249 from the curing bag may be connected to drain lines, and the valves 245 may be turned to permit the fluid to pass out of the bag. The mold may then be opened, the curing bag inlets uncoupled, and the vulcanized tire removed.

From the foregoing it is evident that this method of making pneumatic tires, like the previously described method of making inner tubes, affords opportunity for simplified and economical production of tires of superior quality by elimination of the conventional tuber line and the conventional transverse splice. The product is more uniform because it is formed essentially by a molding operation, and the apparatus is more compact and can be operated with less labor than the usual tire assembly line. This method makes possible a considerable reduction in curing time, since the rubber is extruded hot into the heated mold members, eliminating the warm-up period in the mold which is necessary in conventional practice due to the fact that the raw tire is cold when placed in the mold. This represents a saving of heat as well as a saving in time.

In the modification of the invention shown in Figs. 14 to 17 for making tire flaps, an extruder 250 is provided with a cylindrical headpiece 251 having on its upper surface an axial orifice 252 from which the rubber stock issues. The headpiece 251 constitutes an inner mold member, and an outer circular mold member 253 is mounted for sliding movement into and out of engagement therewith. For this purpose the outer mold member 253 is engaged at either side by a guide 254 secured to the end of a piston rod 255 extending from an actuating cylinder 256 mounted at the side of the extruder body. The cylinder 256 acts to move the mold member 253 axially of the extruding apparatus, and when the member 253 is drawn into engagement with the inner mold member 251, these two members define an annular cavity 257 (Figs. 16 and 17) formed between the flat cylindrical surface 258 of the inner member 251 and the inner surface 259 of the cylindrical member 253. The surface 259 has the profile of the desired tire flap. Inwardly extending flanges 260 (Fig. 16) at each edge of the outer member 253 closely engage the marginal edges of the surface 258 of the inner member 251, forming a tightly closed mold cavity.

Rubber stock 261 is forced, under the influence of the extruder screw 262, into an upwardly and forwardly extending connecting passageway 263 within the head 251, which terminates in the slot-like extrusion orifice 252 leading into the mold cavity 257.

For the purpose of rotating the outer mold member 253, the outer surface thereof is provided with gear teeth 264 which rest on and mesh with two spaced elongated rotatably supported gears 265 disposed below the mold member. One of the supporting gears 265 is rotated by means of a suitable motor 266 and driving belt 267. The brackets 254 slidably engage the member 253 to permit rotation thereof, and the gear teeth 264 may slide along the length of the gears 265 as the positioning cylinder 256 is actuated.

In the course of the mold-charging operation, lubricant is supplied through a lubricant line 268 that leads through the body of the extruder 250 into the head 251 to a thin distributing orifice 269 (Fig. 17) located on the surface 258 of the head and spaced slightly from the extrusion orifice 252 in the direction of rotation of the mold.

The molding operation, with simultaneous rotation and lubrication, takes place with the mold members in engagement as indicated in Figs. 15, 16 and 17, and thereafter the outer mold member 253 is returned outwardly by the cylinder 256, to the position shown in Fig. 14, whereupon the formed tire flap 270 (Figs. 16 and 17) may be removed, for example, by directing an air jet at the edge of the band and removing it through the center opening 271 (Fig. 14) of the mold member. The flap 270 may be subsequently vulcanized by heating it on a suitable form or in a conventional mold. Tire flaps formed in this way are more uniform and more balanced than those formed by extrusion in the usual manner.

Figs. 18 and 19 show an adaptation of the foregoing apparatus for the formation of the tread portion proper and the under-tread and side wall portions of a tire tread from two different types of rubber stocks. In this case, there are provided two independent extruders 275 and 276 each of which delivers a different rubber stock to a common head arrangement 277. The head 277 is made of two sections, the innermost section 278 being provided with an extrusion slot 279 which has a length corresponding to the width of the tread portion proper and which is in communication with one extruder 275. The outermost portion 280 of the head 278 has a longer extrusion orifice 281 which is in communication with the other extruder 276, and which corresponds in length to the width of the entire tread assembly. An outer encircling rotary mold member 282 is adapted to be slidably positioned either in operative engagement with the inner portion 278 of the head 277 as indicated in Fig. 18, or with the outer portion 277 of the head as indicated in Fig. 19. The rotary member may also be removed entirely from the head, as indicated by the dotted lines in Fig. 19. It will be understood that the outer mold member 282 may be positioned axially with respect to the head 277, and may be rotated about its axis by mechanism similar to that represented in Fig. 14.

The inner molding surface of the rotary member 282 has such a contour that when it is in engagement with the inner portion 278 of the head there is defined therebetween an annular cavity 283 having the cross sectional shape of the tire tread portion proper. A lubricant supply slit 284, supplied from a lubricant delivery line 285 passing into the extruder 275, is provided for lubricating the undersurface of the tread as rubber tread stock is extruded into the cavity 283 while rotating the member 282. This step of the forming operation is represented in Fig. 18, and results in formation of the center tread portion 285a in the form of an annular band.

The outer portion 280 of the head 277 is of slightly reduced diameter compared to the inner portion 278 so that when the rotary member 282 is moved outwardly for the next step in the extrusion operation, as indicated in Fig. 19, there is formed therebetween an additional wider cavity 286. This cavity accommodates the under-tread and side wall portions of the tire casing extruded from the orifice 281. This extrusion is again accomplished while rotating the member 282, and while lubricating through a lubricant supply slot 287 supplied from an inlet line 288 leading into the extruder 276.

The surface of the head portion 280 and the inner surface of the rotating portion 282 are so shaped that the side wall portions are formed with a tapered gradually decreasing thickness. For this purpose, a portion 288a of the head section 280 nearest the extruder has a gradually increasing diameter up to a shoulder 289 constituting the division between the head sections 278 and 280. The oppositely disposed part 290 of the inner surface of the rotary member 282 has essentially a constant diameter for sliding engagement with the surface of the section 278, whereby it forms a tight seal therewith when the mold parts are in either of their two charging positions. At the other side of the mold the inner surface of the rotating member 282 is gradually tapered inwardly at 291, and terminates in an inwardly extending flange 292 which seals against the peripheral edge of the head portion 280 to complete closure of the mold cavity 286 when the parts are in the operative position indicated in Fig. 19.

Removal of the completed tread assembly 293 is accomplished as indicated previously. The tread assembly 293 may be placed on a tire carcass (not shown), suitably while the carcass is mounted on a tire building drum, and further shaped and vulcanized in the conventional manner.

In Figs. 20, 21 and 22 there is shown a modified arrangement for extruding and molding a tire tread and side wall from separate rubber stocks directly onto the surface of a previously prepared tire carcass, conveniently while the carcass is in band form and contained on a collapsible tire building drum. This arrangement includes a central turntable assembly 350 composed of an upper generally triangular horizontal supporting plate 351 and a lower horizontal circular plate 352, connected together by a central vertical column 353, the lower end of which extends into a suitable bearing recess 354 in the base mounting 355 of the machine. The periphery of the circular lower horizontal plate 352 is provided with gear teeth 356, whereby the entire turntable assembly 350 may be rotated as a unit by means of a suitable driving motor 357 mounted vertically above the base 355 of the machine on a fixed supporting bracket 358 extending upwardly from the base. The driving motor 357 carries on the lower end of its vertical shaft a pinion gear 359 that meshes with the gear teeth 356 on the edge of the circular plate 352.

Three supporting arms 360, 361 and 362 extend generally radially from the upper plate 351 and are pivotally secured to the upper surface thereof by pivotal mountings 363, 364 and 365, respectively. At the outer end of each arm there is rotatably supported a tire building drum 366, 367, 368, one end of the horizontal shaft of each drum passing rotatably through each supporting arm. The end of each tire drum shaft carries a driving gear 369, 370, 371 that is adapted to engage a pinion gear driven by a driving motor 372, 373, 374 fixed to the base 355 of the machine at each of the three operating stations thereof. At each operating station there is also provided a trunnion 375, 376 and 377 extending upwardly from the base 355 of the machine and open at the top so that the shaft of the building drum can be lowered thereinto or raised therefrom as desired. The arrangement is such that when one end of the shaft of the tire building drum is in proper position in the trunnion bearing surface, the driving gear on the opposite end of the drum shaft operatively engages the pinion gear of the driving mechanism.

The drum 366 shown at the 7 o'clock position in Fig. 20 is in position for a tire carcass building operation; that is, when the drum 366 is in the position shown the operator builds up a tire carcass 366a thereon by superimposing plies of rubberized tire fabric on the drum and incorporating wire beads in the marginal edges in the usual manner. It will be understood that the carcass building operation requires rotation of the drum by the driving motor 372. After the carcass is built on the drum, the turntable 350 is rotated one-third of a revolution by the driving motor 357 to bring the drum into alignment with the first extruder 380. It will be understood that before the turntable 355 can be rotated the drums 366, 367, 368 must be lifted out of their respective supporting trunnions 375, 376, 377. For this purpose three vertical hydraulic cylinders 381, 382, 383 are mounted on the base plate 352 of the turntable 350, and a piston rod 384 (Fig. 21) extending upwardly from each cylinder through a suitable opening 385 provided for this purpose in the upper plate 351 of the turntable 350 is pivotally secured at its upper end to the inwardly and upwardly projecting end of each supporting arm, such as the end 386 of arm 361. It will be understood that hydraulic fluid can be supplied to the cylinders mounted on the turntable by means of a rotary seal distributing coupling, as described above in connection with the hydraulic cylinders 107 shown in Fig. 3.

The first extruder 380 has the usual entrance hopper 387 into which the rubber stock constituting the side wall and undertread portion of the tire casing is charged, and the feeding screw 388 (Fig. 22) thereof is rotated by the usual driving mechanism 389. This extruder is provided with a head assembly that is split diametrically, as best seen in Fig. 21, into a lower enclosing half or shell 390 that is fixed to the extruder body, and a movable upper enclosing shell 391 that is hinged to the lower half 390 at 392. The upper shell 391 may be swung upwardly about the hinge 392 by means of a vertical hydraulic cylinder 394 that is fixed to the base 355 of the machine and that has a piston rod 395 extending upwardly therefrom and pivotally attached at its upper end to a projecting arm 396 extending from the upper shell member 391 of the extrusion head. When the upper shell 391 is swung upwardly as indicated by the dotted lines in Fig. 21, and when the tire building drum, such as drum 367, has been elevated to the position shown by the dotted lines by means of hydraulic cylinder 382 and the turntable 350 rotated to bring the drum 367 and the extruder 380 into proper alignment, then the drum 367 may be lowered into position within the lower half 390 of the extrusion head, with one end of the drum shaft resting in the trunion 376 and the driving gear 370 on the other end of the drum shaft in engagement with the drive 373. Thereafter, the upper half 391 of the extrusion head is lowered over the upper surface of the drum to completely enclose the same, with inwardly extending side flanges 393 of the extruder head in engagement with the lateral edges of the drum assembly.

The interior contour of the shell members 390, 391 constituting the enclosing extruder head is such that there is defined between the interior surface of the shell members and the exterior surface of a tire carcass 367a carried by the drum 367, an annular mold cavity 399 having the cross-sectional shape of the tire side wall and under-tread portions. With the drum in position within the extruder head this cavity 399 is charged with rubber stock by the action of the screw 388 of the extruder 380, which delivers the heated vulcanizable stock 400 through an extrusion orifice 401 in the lower shell 390. The extrusion orifice 401 extends across the entire width of the inner surface of the shell 390. Simultaneously with this extrusion operation, the drum 367 is rotated in a clockwise direction as viewed in Fig. 22, by means of the drive 373, and in this way the rubber stock is carried completely around the annular cavity 399 to form the tire side wall and under-tread 402 superimposed on the carcass 367a to which the rubber stock adheres. At the same time, a thin film of lubricant is continuously introduced between the surface of the moving rubber stock and the inner surface of the enclosing shells 390, 391, through a lubricant line 403 that extends through the body of the extruder head and terminates in a fine slit-like orifice 404 extending across the entire width of the inner face of the lower shell 390 parallel to the extrusion orifice 401 at a point slightly spaced therefrom in the direction of travel of the rubber. Upon completion of a revolution of the drum 367, the rubber stock is sheared off at the extrusion orifice 401 leaving a complete annular band 402 of stock in the cavity 399.

Upon completion of the foregoing first extrusion operation, the turntable 350 is again rotated one-third of a revolution as described previously to bring the drum carrying the carcass and the extruded stock into alignment with the second extruder 405, shown at the 5 o'clock position in Fig. 20, which is intended to apply the tire tread portion proper, that is, the road-contracting portion of the tire casing. For this purpose the second extruder 405 is provided at its delivery end with a diametrically split extrusion head 406 into which the tire drum fits, and which is constructed in the same manner as the enclosing head of the first extruder 380, except that the contour of the interior surface of the head 406 of the second extruder 405 is such that there is defined between a tire building drum 368 contained therein and carrying a tire carcass 368a and an extruded side wall and under-tread layer 407 of rubber stock, an annular cavity 408 having the cross-sectional shape of the tire tread proper. It will be understood that the cavity 408 is fed with rubber tread stock by the action of the extruder 405 through an extrusion orifice (not shown) contained in the extrusion head 406 and extending across the width of the cavity. The drum is rotated as before during the tread extrusion operation by means of the drive 374 and also lubricant is introduced between the surface of the moving rubber stock and the interior surface of the stationary enclosing head 406 through the lubricant supply line 409 passing from the outside of the extruder head into the mold cavity.

On completion of the second extrusion operation the turntable 350 may be rotated one-third of a revolution again to bring the drum back to the initial 7 o'clock position indicated by drum 366 and the drum may be collapsed and the completed tire casing in band form removed for subsequent shaping and vulcanizing in the conventional manner. It will be evident that the foregoing arrangement makes possible production of tire casings at relatively great speed and with maximum convenience, since the carcass-building operation may be performed at one station, while the two extrusion operations are being carried out simultaneously at their respective stations. Because of the manner in which the drum is rotated while the rubber stock is being extruded thereon, the distribution of the rubber stock to all parts of the mold cavity is assured since the stock is carried around by the rotation of the drum. Such rotation of the drum and travel of the stock is facilitated by the continuous introduction of lubricant, such as paraffin oil, between the surface of the rubber and the surface of the stationary enclosing extrusion head. As a result, a compactly and uniformly shaped tire casing is obtained. The various rubber stocks constituting the tire casing are firmly adhered to each other and to the tire carcass because they are united under pressure while the stock is at an elevated extrusion temperature. The inconveniences and variability of the conventional tread extrusion operation, and the conventional splicing operation, are avoided. Since the tread is formed in an essentially closed mold cavity, it is uniform and dimensionally stable and the resulting tire is accurately balanced.

Having thus described my invention, what I claim and desire to protect by Letters Patent is:

1. Apparatus for forming at least a trans-axial half of an inner tube, tire casing, or similar annular object, comprising a shell member and a cooperating core member defining therebetween an annular cavity having the form of at least the said trans-axial half of the object, said core member having an extrusion passageway extending therethrough terminating in an extrusion orifice extending entirely across the face of the mold cavity defined by said core member, said core member also having a lubricant passageway therethrough terminating in a lubricating orifice at said cavity face near said extrusion orifice, and means for rotating said shell member with respect to the core member about the principal axis of the cavity.

2. Apparatus for forming a trans-axial half of an inner tube, tire casing, or similar annular object, comprising a shell member and a cooperating core member defining therebetween an annular cavity having the form of a trans-axial half of the object, said core member having an extrusion passageway extending therethrough terminating in an extrusion orifice extending entirely across the face of the mold cavity defined by said core member, means in the face of said core member for applying lubricant, and means for rotating said shell member with respect to the core member about the principal axis of the cavity.

3. Apparatus for forming a trans-axial half of an inner tube, tire casing, or similar annular object, comprising a shell member and a cooperating core member defining therebetween an annular cavity having the form of a trans-axial half of the object, said core member having an extrusion passageway extending therethrough terminating in an extrusion orifice extending entirely across the face of the mold cavity defined by said core member, and means for rotating said shell member with respect to the core member about the principal axis of the cavity.

4. Apparatus for forming inner tubes, tire casings and similar annular objects comprising in combination means for advancing heated viscous rubber stock under pressure, a core member attached to the delivery end of said rubber advancing means, annular protrusions on the upper and lower surfaces of said core piece each defining one face of a cavity having the form of a trans-axial half of the annular object, shell members disposable over the upper and lower surfaces of the core piece, each of said shell members having an annular recess defining an opposite face of said cavity, means for rotating said shell members with respect to the core member about the principal axis of the cavity, said core member having an extrusion passageway in communication with said rubber advancing means, said passageway diverging upwardly and downwardly within said core member and terminating in extrusion orifices at the cavity faces defined by said protrusions on the core member, and means for applying lubricant to the said protrusions to prevent rubber from adhering thereto.

5. Apparatus for forming inner tubes, tire casings and similar annular objects comprising in combination means for advancing heated viscous rubber stock under pressure, a core member attached to the delivery end of said rubber advancing means, annular protrusions on the upper and lower surfaces of said core piece each defining one face of a cavity having the form of a trans-axial half of the annular object, shell members disposable over the upper and lower surfaces of the core piece, each of said shell members having an annular recess defining an opposite face of said cavity, means for rotating said shell members with respect to the core member about the principal axis of the cavity, said core member having an extrusion passageway in communication with said rubber advancing means, said passageway diverging upwardly and downwardly within said core member and terminating in extrusion orifices at the cavity faces defined by said protrusions on the core member.

6. Apparatus for molding annular rubber objects in two trans-axial halves and uniting such halves comprising in combination a pair of mold shells, means for moving said mold shells into and out of engagement with each other, an extruder for delivering rubber stock under pressure, a core piece attached to said extruder, means for moving said mold shells into and out of alignment with said core piece, the opposite faces of said core piece defining with said mold shells when in engagement therewith two mold cavities having the shape of a trans-axial half of the object, said core piece having an extrusion passageway therethrough leading from said extruder to said cavities, means for rotating the mold shells in engagement with the core piece to distribute the rubber stock around the cavities, means for lubricating the faces of the core piece to prevent the rubber stock from adhering thereto, thereby forming two trans-axial halves of the object which are spliced together when the mold shells are removed from the core piece and brought into engagement with each other.

7. Apparatus for molding annular rubber objects in two trans-axial halves and uniting such halves comprising in combination a supporting member, a pair of opposed arms extending from said supporting member and pivotally attached thereto for movement toward and away from each other, a mold shell rotatably supported on each arm toward the end thereof, an extruder for delivering rubber stock under pressure, a core piece attached to the delivery end of the extruder, means for moving the supporting member to bring the arms into and out of alignment with the core piece, means for bringing the arms toward and away from each other to bring the mold shells into and out of engagement with opposite surfaces of the core piece, the mold shells and core piece defining when in engagement with each other annular cavities having the shape of a trans-axial half of the object, the said core piece having an extrusion passageway therethrough for delivering rubber stock from the said extruder to said cavities, means for rotating the mold shells in contact with the core piece to distribute the rubber stock completely around the cavities, and means for lubricating the surfaces of the core piece during said rotation, thereby forming two trans-axial halves of the object which are spliced together along a circumferential line when the mold shells are moved out of engagement with said core piece, moved out of alignment therewith, and moved together into contact with each other.

8. Apparatus for molding annular rubber objects in two trans-axial halves and uniting such halves comprising in combination a supporting member, a pair of opposed arms extending from said supporting member and pivotally attached thereto for movement toward and away from each other, a mold shell rotatably supported on each arm toward the end thereof, an extruder for delivering rubber stock under pressure, a core piece attached to the delivery end of the extruder, means for moving the supporting member to bring the arms into and out of alignment with the core piece, means for bringing the arms toward and away from each other to bring the mold shells into and out of engagement with opposite surfaces of the core piece, the mold shells and core piece defining when in engagement with each other annular cavities having the shape of a trans-axial half of the object, the said core piece having an extrusion passageway therethrough for delivering rubber stock from the said extruder to said cavities, and means for rotating the mold shells in contact with the core piece to distribute the rubber stock completely around the cavities, thereby forming two trans-axial halves of the object which are spliced together along a circumferential line when the mold shells are moved out of engagement with said core piece, moved out of alignment therewith, and moved together into contact with each other.

9. Apparatus for molding annular rubber objects comprising in combination a central turntable, arms extending radially of said turntable and pivotally secured thereto, means for raising and lowering said arms, mold members rotatably supported toward the outer end of said arms, means for rotating said turntable to move said rotatable mold members along a circular path, an extruder adjacent said path, a fixed mold member secured to the delivery end of the extruder and disposed across said path, each of said rotatable mold members defining with said fixed mold member when in operative engagement an annular mold cavity, and said fixed mold member having therethrough an extrusion passageway leading from the extruder to the mold cavity and means for rotating the rotatable mold member when in engagement with the fixed mold member.

10. Apparatus for molding annular rubber objects comprising in combination a central turntable, arms extending radially of said turntable and pivotally secured thereto, means for raising and lowering said arms, mold members rotatably supported toward the outer end of said arms, means for rotating said turntable to move said rotatable mold members along a circular path, an extruder adjacent said path, a fixed mold member secured to the delivery end of the extruder and disposed across said path, each of said rotatable mold members defining with said fixed mold member when in operative engagement an annular mold cavity, and said fixed mold member having therethrough an extrusion passageway leading from the extruder to the mold cavity means for rotating the rotatable mold member when in engagement with the fixed mold member and means for feeding lubricant to the surface of the fixed mold member during said rotation.

11. Apparatus for molding annular rubber objects in two trans-axial halves and uniting same comprising in combination a central turntable, pairs of pivotal supporting arms extending radially from said turntable, means for moving said arms toward and away from each other, mold shell members rotatably supported toward the outer end of each of said arms, means for rotating said turntable to move said rotatable mold shells along a circular path, a fixed mold core secured to the delivery end of the extruder and disposed across said path said mold shells and said mold core defining, when one of said mold shells is in operative engagement with each side of said mold core, two mold cavities each having the form of a trans-axial half of the annular object, said core having therethrough an extrusion passageway leading from the extruder to the said cavities, and means for rotating the mold shells when in engagement with the mold core to distribute rubber stock from said extrusion passageway completely around said cavities, thereby forming the object in two trans-axial halves which are spliced together when said mold shells are removed from said mold core and brought into contact with each other.

12. Apparatus for molding the outer rubber covering of a tire casing from two different rubber stocks comprising in combination a mold shell having in its face a recess having the contour of the exterior of the tire casing, a first removable mold core adapted to mate with said shell, said core having a protruding face having the contour of the exterior of the tire casing over a portion of its surface and providing between its remaining surface and the surface of the mold shell recess a mold cavity having the shape of a portion of the rubber covering of tire casing composed of one rubber stock, a second removable mold core adapted to mate with said mold shell and having a protruding face providing between it and the surface of the mold shell a cavity having the shape of the entire rubber covering of the tire casing, said first mentioned core having an extrusion passageway therethrough terminating in an extrusion orifice in the surface of the protrusion on said core and extending across that portion of the protrusion providing said first mentioned cavity, and said second mentioned core having an extrusion passageway therethrough terminating in an extrusion orifice in the surface of the protrusion on said core and extending across a part of the protrusion corresponding to the location of a second rubber stock of the rubber covering of the tire casing, means for rotating said mold shell with respect to said cores about the principal axes of the cavities to carry rubber stocks introduced at said orifices completely around said cavities and each of said cores having lubricant passageways therethrough opening into said cavities at points slightly spaced from said extrusion orifices in the direction of rotation of said mold shell.

13. Tire molding and vulcanizing apparatus comprising in combination a central turntable, pairs of vertically spaced arms extending from said turntable and pivotally secured thereto, means for moving the arms toward and away from each other in a vertical plane, pairs of mold shells rotatably supported toward the outer extremity of each arm, said pairs of mold shells being provided with recess which when the molds are brought together in operative engagement by moving said arms toward each other define an annular cavity having the shape of a tire casing, means for rotating said turntable to move said mold shells along a circular path in a horizontal plane, two extruding devices adapted to deliver two different rubber stocks located adjacent said path, a mold core secured to each of said extruding devices extending generally horizontally across said path, protrusions on the upper and lower faces of said mold cores adapted to mate with the recess of said mold shells, the protrusion on the first of said cores having such a contour that there is defined between each such protrusion and a recess of a mold shell an annular mold cavity having the form of a trans-axial half of a portion of the outer rubber covering of a tire casing composed of one rubber stock, and the protrusion on the second of said cores having such a contour that there is defined between each such protrusion and a recess of a mold shell an annular mold cavity having the form of a trans-axial half of the outer rubber covering of the tire casing, said cores having passageways therethrough leading from said extruders to said cavities, means for rotating said shells when said shells are brought into operative engagement successively with said first and said second core to form trans-axial halves of the outer rubber covering of the tire casing from two different rubber stocks, means for lubricating the faces of the cores to prevent the rubber stocks from adhering thereto, said mold shells having heating chambers therein for heating the tire casing, means for passing a heated fluid medium into said chambers, said mold shells having at least one opening therethrough for a connecting stem of a curing bag disposed within a tire casing enclosed between the shells, and means for passing a heated fluid medium to such stem.

14. Apparatus for molding tire flaps and the like comprising in combination an extruder, a drum-shaped head fixed to said extruder, an encircling shield for said head defining with said head an annular cavity, means for moving said shield into and out of engagement with said head, means for rotating said shield with respect to the head about the principal axis of the cavity when in engagement with said head, said head having therethrough an extrusion passageway leading from said extruder and terminating in an extrusion orifice extending across the face of said cavity, and said head having a lubricant passageway leading from outside the extruder and terminating in an orifice at said cavity face near said extrusion orifice.

15. An apparatus for molding the outer rubber covering of a tire casing from separate tread stock and side wall stock comprising in combination two extruding devices, one for each of said stocks, a drum-shaped head fixed to said extruding devices, an encircling shield for said head, said shield having on its inside surface a contour corresponding to the external shape of a tire covering when in the form of a generally flat band, a portion of said head nearest said extruding devices having such a contour as to define with said encircling shield an annular cavity having the shape of the central portion of the tire tread and the contour of a portion of said head adjacent said first mentioned portion having a contour such as to define with said encircling shield an annular cavity having the shape of the rubber tire covering, said head having therethrough an extrusion passageway leading from one of said extruding devices to said tread cavity, and a second extrusion passageway leading from the other extruder to said second mentioned cavity, means for moving the encircling shield into and out of engagement with either of said portions of said head, means for rotating said encircling shield with respect to said head about the principal axis of said cavities, when in engagement with said head, and means for lubricating the surface of the head comprising a lubricant passageway therethrough terminating in a lubricating orifice at said cavities near said extrusion orifices.

References Cited in the file of this patent

UNITED STATES PATENTS

| 1,469,378 | Burger | Oct. 2, 1923 |
| 1,591,767 | Maynard | July 6, 1926 |
| 1,731,006 | Goodwin et al. | Oct. 8, 1929 |
| 1,844,972 | Parkhurst | Feb. 16, 1932 |
| 2,365,374 | Bailey | Dec. 19, 1944 |
| 2,497,226 | McNeill | Feb. 14, 1950 |
| 2,569,935 | Le Guillon et al. | Oct. 2, 1951 |